(12) United States Patent
Govande et al.

(10) Patent No.: US 9,026,687 B1
(45) Date of Patent: May 5, 2015

(54) HOST BASED ENUMERATION AND CONFIGURATION FOR COMPUTER EXPANSION BUS CONTROLLERS

(71) Applicant: LSI Corporation, San Jose, CA (US)

(72) Inventors: Nilesh S. Govande, Pune (IN); Rajendra Singh, Pune (IN)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 14/140,669

(22) Filed: Dec. 26, 2013

(51) Int. Cl.
*G06F 13/20* (2006.01)
*G06F 13/10* (2006.01)

(52) U.S. Cl.
CPC .............. *G06F 13/10* (2013.01); *G06F 13/20* (2013.01)

(58) Field of Classification Search
CPC ............... G06F 13/4022; G06F 13/20; G06F 2213/0026; H04L 41/0806
See application file for complete search history.

(56) References Cited

U.S. PATENT DOCUMENTS

| | | | | |
|---|---|---|---|---|
| 7,710,587 | B2 * | 5/2010 | Crosier et al. ............... | 358/1.15 |
| 2005/0289250 | A1 * | 12/2005 | Mulla et al. ...................... | 710/9 |
| 2011/0119423 | A1 * | 5/2011 | Kishore et al. ................ | 710/302 |
| 2012/0265910 | A1 * | 10/2012 | Galles et al. .................. | 710/300 |
| 2013/0024595 | A1 * | 1/2013 | Subramaniyan et al. ...... | 710/308 |
| 2013/0250810 | A1 * | 9/2013 | Ho et al. ....................... | 370/255 |

* cited by examiner

*Primary Examiner* — Idriss N Alrobaye
*Assistant Examiner* — Ronald Modo
(74) *Attorney, Agent, or Firm* — Duft Bornsen & Fettig LLP

(57) ABSTRACT

A controller includes a communications interface configured to communicatively couple a host to a computer expansion bus configured to perform peripheral device enumeration and configuration. The computer expansion bus is configured to communicatively couple the host to a peripheral device. The controller also includes a processor configured to facilitate enumeration and configuration by the host of the peripheral device. The controller further includes a memory having computer executable instructions stored thereon. The computer executable instructions are configured for execution by the processor to facilitate enumeration and configuration of a topology associated with the communicative coupling between the host and the peripheral device, where the topology is enumerated and configured by the host.

18 Claims, 3 Drawing Sheets

US 9,026,687 B1

HOST BASED ENUMERATION AND CONFIGURATION FOR COMPUTER EXPANSION BUS CONTROLLERS

FIELD OF THE INVENTION

The present disclosure is related to systems and techniques for implementing host based enumeration and configuration for computer expansion bus controllers.

BACKGROUND

Peripheral component interconnect express (PCI Express, PCIe) is a high-speed serial computer expansion bus standard based on point-to-point topology, with separate serial links connecting each device to the host. Some revisions of the PCIe standard support hardware input/output (I/O) virtualization. The PCIe electrical interface is also used in other standards, such as laptop expansion card interface standards and so forth.

SUMMARY

A controller includes a communications interface configured to communicatively couple a host to a computer expansion bus configured to perform peripheral device enumeration and configuration. The computer expansion bus is configured to communicatively couple the host to a peripheral device. The controller also includes a processor configured to facilitate enumeration and configuration by the host of the peripheral device. The controller further includes a memory having computer executable instructions stored thereon. The computer executable instructions are configured for execution by the processor to facilitate enumeration and configuration of a topology associated with the communicative coupling between the host and the peripheral device, where the topology is enumerated and configured by the host.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

Other embodiments of the disclosure will become apparent.

DETAILED DESCRIPTION

Figure 1:
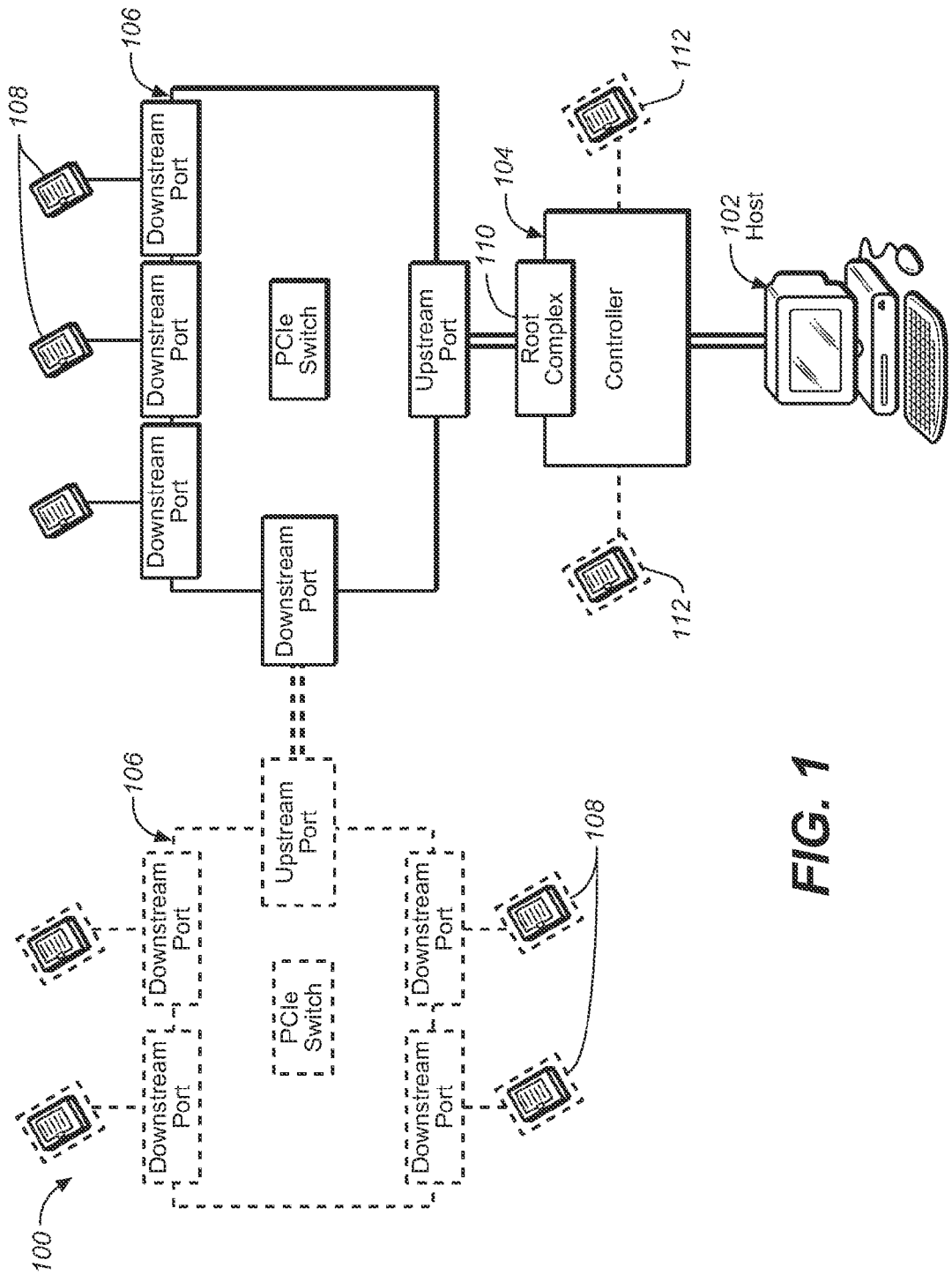
FIG. 1 is a diagrammatic illustration of a system including a controller connecting a host to a PCIe switch in accordance with example embodiments of the present disclosure.
Figure 2:
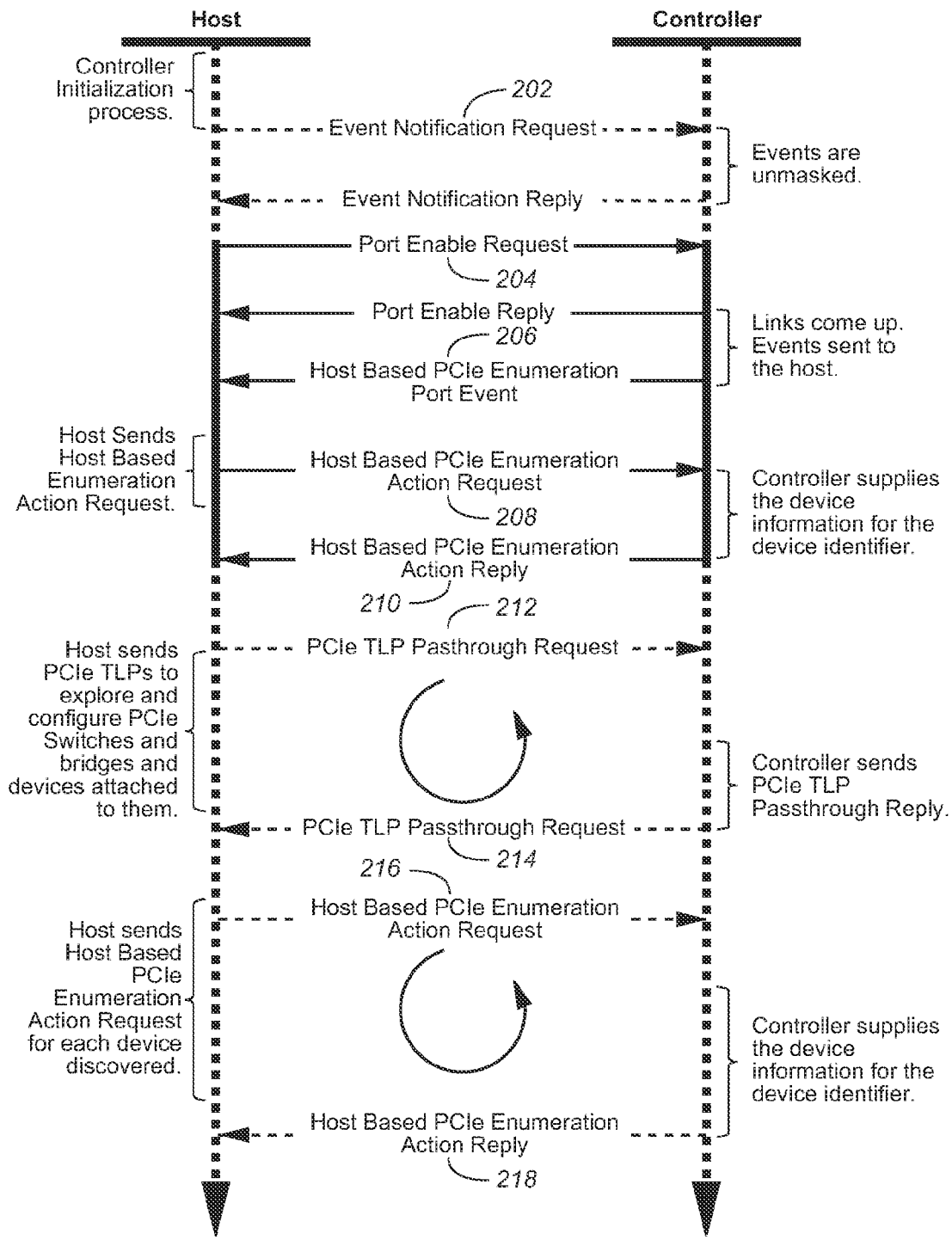
FIG. 2 is a diagrammatic illustration of messages transmitted and received between a host (e.g., the host illustrated in FIG. 1) and a controller (e.g., the controller illustrated in FIG. 1) in accordance with example embodiments of the present disclosure.
Figure 3:
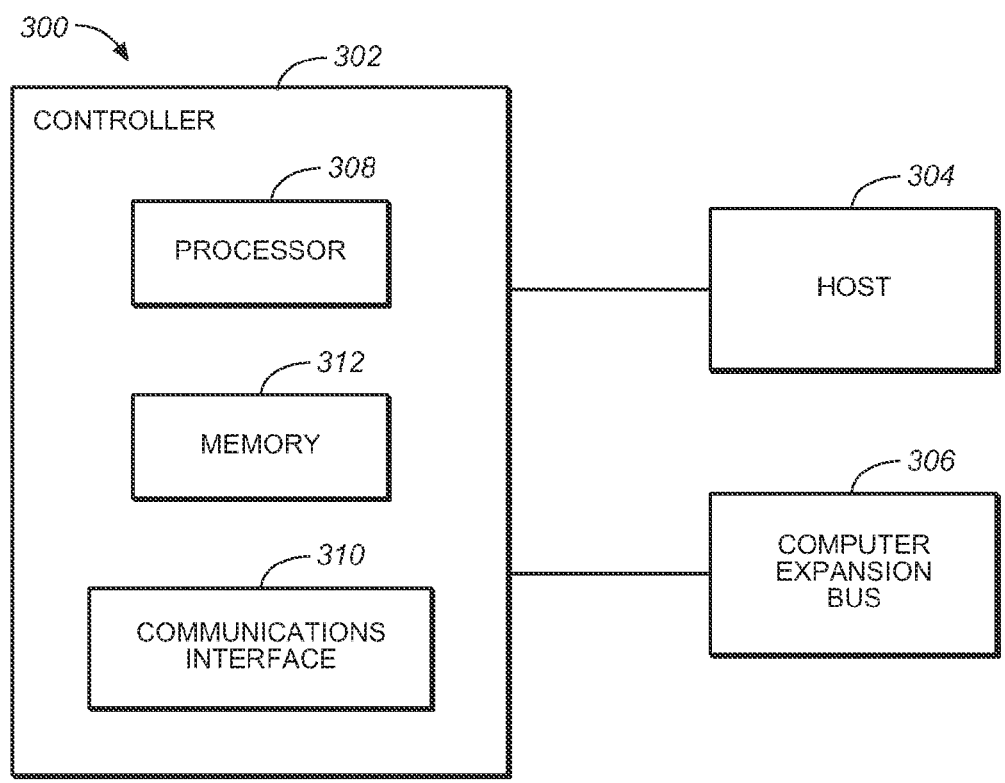
FIG. 3 is a block diagram illustrating a system including a controller configured to connect a host (e.g., the host illustrated in FIG. 1) to a computer expansion bus (e.g., the PCIe switch illustrated in FIG. 1) in accordance with example embodiments of the present disclosure.

Referring generally to FIGS. 1 through 3, a system 100 is described. The system 100 includes a host 102 (e.g., an information handling system device such as a personal computer (PC)) connected to a controller 104 (e.g., a host bus adapter (HBA), an input/output (IO) controller (IOC), and so forth). The controller 104 is operatively coupled to a computer expansion bus comprising a switch 106 that implements the Peripheral Component Interconnect Express (PCI Express, PCIe) standard. In some embodiments, the switch 106 is implemented as a motherboard-level interconnect (e.g., to link motherboard-mounted peripherals). For example, the controller 104 is included in a host bus adapter card configured to seat in the PCIe slot of a motherboard. In other embodiments, the switch 106 is implemented as a passive backplane interconnect. In still further embodiments, the switch 106 is implemented as an expansion card interface (e.g., for add-in boards).

The switch 106 includes circuitry configured to communicatively couple the host 102 to one or more peripheral devices 108. For example, the host 102 is communicatively coupled with a number of peripheral devices 108 configured as storage devices, such as hard disk drives (HDD) comprising a storage array (e.g., in a PCIe storage fabric implementation, where the controller 104 is implemented as a redundant array of independent disks (RAID) controller, and where the peripheral devices 108 include one or more advanced host controller interface (AHCI) drives, non-volatile memory express (NVMe) drives, small computer system interface (SCSI) over PCIe (SOP) drives, solid state drives (SSD), and so forth). In embodiments of the disclosure, the controller 104 is coupled with a computer expansion bus comprising the PCIe switch 106. In some embodiments, the computer expansion bus also encompasses functionality associated with other protocols. For example, the host 102 can be coupled with one or more peripheral devices using a variety of protocols, including but not necessarily limited to: a serial attached small computer system interface (SAS) protocol, a serial advanced technology attachment (SATA) protocol, a redundant array of independent disks (RAID) standard, a fibre channel (FC) protocol, and so forth. In some embodiments, the host 102 is coupled with an expander having SAS and/or SATA capabilities along with the PCIe switch 106, and the host 102 communicates with peripheral devices 112, such as SAS drives, SATA drives, FC drives, and so forth, via the controller 104. However, these protocols are provided by way of example only and are not meant to limit the present disclosure. In other embodiments, a different protocol is used when the host 102 is coupled with a peripheral device 108. Further, in some embodiments, the system 100 implements a PCIe storage topology with one or more cascaded switches 106 (e.g., as shown in FIG. 1).

In some embodiments, the controller 104 includes a root complex 110. In a typical PCIe configuration, the root complex 110 enumerates the PCIe topology tree and configures the peripheral devices 108. For example, when the root complex 110 is included in a host bus adapter or an input/output controller, the process of discovering and configuring the peripheral devices 108 can be performed by the controller 104 with limited visibility to the host 102. This implementation restricts the role of an operating system implemented by the host 102, as well as visibility into the PCIe topology devices tree behind the root complex 110. For example, a file system and/or drivers of the host 102 typically require use of a storage array to fulfill the requirements of an application executed by the host 102. However, in a typical PCIe configuration, drivers at the host 102 are generally unable to take privileged actions, limiting the ability of the root complex 110 to amicably use and distribute memory of the host 102 to the peripheral devices 108. For instance, before enumerating the PCIe tree originating from the root complex 110, the controller 104 may not know how much memory it will require from the host 102. In this configuration, the host 102 has a root complex that enumerates the controller 104 as an end device and configures its base address registers according to its requirements. When the controller 104 makes an assumption and posts this memory requirement to the host 102, the root complex 110 may subsequently exhaust its memory resources (e.g., when assigning PCIe inbound memory (PIM) to the peripheral devices 108).

In accordance with the present disclosure, systems and techniques are provided that furnish control of PCIe enumeration and configuration to the host 102 and/or one or more drivers implemented by the host 102. In embodiments, the host 102 functions as the master for enumeration and configuration of the PCIe discovery tree behind the root complex 110 of the controller 104. The host 102 enumerates and configures the topology of the system 100 according to its usage requirements. Thus, the host 102 has a complete view of the PCIe device tree behind the controller 104. For instance, with reference to FIG. 2, the host 102 configures the PCIe topology and enumerates and configures the peripheral devices 108 using a series of messages 200-208. In embodiments of the disclosure, the host 102 uses messages 200-208 to allocate and de-allocate device resources, configure memory associated with the peripheral devices 108 (e.g., base address register (BAR) memory range allocation), and receive information regarding changes to connections of the controller 104 to the topology.

First, enumeration of the PCIe topology tree by the controller 104 is disabled. In some embodiments, the host 102 determines whether the controller 104 supports host based enumeration of its PCIe topology tree by examining the capabilities of the controller 104, and determines whether host based enumeration is currently enabled on the controller 104 by reading the current configuration flags. When host based enumeration is enabled, the host 102 uses an event notification request 202 to unmask the events described below. When using host based enumeration as described herein, the host 102 is responsible for asking the controller 104 to create device identifiers for peripheral devices 108 found in the topology. During initialization (e.g., after sending a controller initialization request and the event notification request 202), the host 102 uses a port enable request 204 to enable the PCIe ports. Next, the controller 104 resets the PCIe core and waits for PCIe links to initialize, and then performs configuration reads to peripheral devices 108 directly attached to the controller 104. The controller 104 then reports topology changes for controller PCIe ports using a host based PCIe enumeration port event 206.

The host 102 performs enumeration after receiving the host based PCIe enumeration port event 206. For example, the host 102 sends a host based PCIe enumeration action request 208 with the operation field set to "ADD_DEVICE" to allocate controller resources for the direct attached peripheral devices 108 indicated in the event. In embodiments of the disclosure, the host 102 also sends base address configuration attributes, and interrupt configuration attributes along with the "ADD_DEVICE" action request to the controller 104. For peripheral devices 108 directly attached to the controller 104, the host based PCIe enumeration port event 206 provides the host 102 with information needed to create a device identifier. The controller 104 allocates device identifiers and provides device information for a device identifier specified in the host based PCIe enumeration action request 208 and sends a host based PCIe enumeration action reply 210.

In some embodiments, when PCIe switch attached peripheral devices 108 are attached, the host 102 sends a configuration read passthrough request message (e.g., a PCIe transaction layer packet (TLP) passthrough request 212) to explore the rest of the domain (e.g., in a depth first search order) and obtain the information needed to create device handles. For example, the host 102 examines PCIe to PCIe virtual bridges at upstream and downstream ports. The controller 104 sends a PCIe transaction layer packet passthrough reply 214 when the transaction layer packet response frame is received from the host 102. The host 102 uses a host based PCIe enumeration action request 216 to add and remove device identifiers from the controller 104, and to specify parameters for the peripheral devices 108 found in the topology. For example, the host 102 sends one or more host based PCIe enumeration action requests 216 with the operation field set to "ADD_DEVICE" to allocate controller resources for any peripheral devices 108 the host 102 found attached to the PCIe switch 106. In embodiments of the disclosure, the host 102 also sends base address configuration attributes, memory based routing configuration attributes for bridges, and interrupt configuration attributes along with the "ADD_DEVICE" action request to the controller 104. The controller 104 allocates device identifiers and provides device information for a device identifier specified in the host based PCIe enumeration action request 216 and sends a host based PCIe enumeration action reply 218. In some embodiments, when host based enumeration is enabled, the host based PCIe enumeration action request 216 is the only message the host 102 uses to add or remove a peripheral device 108 from the controller 104. In embodiments of the disclosure, the PCIe topology tree traversal is done in a PCIe standard depth first search order.

Referring to FIG. 3, a system 300 includes a controller 302 operatively coupled with a host 304 (e.g., host 102 shown in FIG. 1) and a computer expansion bus 306 (e.g., via PCIe switch 106 shown in FIG. 1). The controller 302, including some or all of its components, can operate under computer control. For example, a processor 308 can be included with or in a controller 302 to control the components and functions of systems 300 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the systems 300. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The processor 308 provides processing functionality for the controller 302 and can include any number of processors, micro-controllers, or other processing systems, and resident or external memory for storing data and other information accessed or generated by the system 300. The processor 308 can execute one or more software programs that implement techniques described herein. The processor 308 is not limited by the materials from which it is formed or the processing mechanisms employed therein and, as such, can be implemented via semiconductor(s) and/or transistors (e.g., using electronic integrated circuit (IC) components), and so forth.

The controller 302 includes a communications interface 310. The communications interface 310 is operatively configured to communicate with components of the system 300.

For example, the communications interface 310 can be configured to transmit data for storage in the system 300, retrieve data from storage in the system 300, and so forth. The communications interface 310 is also communicatively coupled with the processor 308 to facilitate data transfer between components of the system 300 and the processor 308 (e.g., for communicating inputs to the processor 308 received from a device communicatively coupled with the system 300). It should be noted that while the communications interface 310 is described as a component of a system 300, one or more components of the communications interface 310 can be implemented as external components communicatively coupled to the system 300 via a wired and/or wireless connection.

The communications interface 310 and/or the processor 308 can be configured to communicate with a variety of different networks including, but not necessarily limited to: a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to be restrictive of the present disclosure. Further, the communications interface 310 can be configured to communicate with a single network or multiple networks across different access points.

The controller 302 also includes a memory 312. The memory 312 is an example of tangible, computer-readable storage medium that provides storage functionality to store various data associated with operation of the controller 302, such as software programs and/or code segments, or other data to instruct the processor 308, and possibly other components of the controller 302, to perform the functionality described herein. Thus, the memory 312 can store data, such as a program of instructions for operating the controller 302 (including its components), and so forth. It should be noted that while a single memory 312 is described, a wide variety of types and combinations of memory (e.g., tangible, non-transitory memory) can be employed. The memory 312 can be integral with the processor 308, can comprise stand-alone memory, or can be a combination of both. The memory 312 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In embodiments of the disclosure that manifest in the form of integrated circuits, the various blocks discussed in the above disclosure can be implemented as integrated circuits along with other functionality. Such integrated circuits can include all of the functions of a given block, system, or circuit, or a portion of the functions of the block, system or circuit. Further, elements of the blocks, systems, or circuits can be implemented across multiple integrated circuits. Such integrated circuits can comprise various integrated circuits including, but not necessarily limited to: a system on a chip (SoC), a monolithic integrated circuit, a flip chip integrated circuit, a multichip module integrated circuit, and/or a mixed signal integrated circuit. In embodiments of the disclosure that manifest in the form of software, the various blocks discussed in the above disclosure represent executable instructions (e.g., program code) that perform specified tasks when executed on a processor. These executable instructions can be stored in one or more tangible computer readable media. In some such embodiments, the entire system, block or circuit can be implemented using its software or firmware equivalent. In some embodiments, one part of a given system, block or circuit can be implemented in software or firmware, while other parts are implemented in hardware.

Although embodiments of the disclosure have been described in language specific to structural features and/or methodological acts, it is to be understood that the subject matter defined in the appended claims is not necessarily limited to the specific embodiments described. Although various configurations are discussed, the apparatus, systems, subsystems, components and so forth can be constructed in a variety of ways without departing from teachings of this disclosure. Rather, the specific features and acts are disclosed as embodiments of implementing the claims.

What is claimed is:

1. A controller comprising:
    a communications interface configured to communicatively couple a host to a computer expansion bus configured to perform peripheral device enumeration and configuration, the computer expansion bus configured to communicatively couple the host to a peripheral device;
    a processor configured to facilitate enumeration and configuration by the host of the peripheral device; and
    a memory having computer executable instructions stored thereon, the computer executable instructions configured for execution by the processor to facilitate enumeration and configuration of a topology associated with the communicative coupling between the host and the peripheral device, wherein the topology is enumerated and configured by the host,
    wherein facilitating enumeration and configuration of the topology associated with the communicative coupling between the host and the peripheral device comprises responding to a query received from the host regarding whether the controller supports host based enumeration and configuration of the peripheral device.

2. The controller as recited in claim 1, wherein the computer expansion bus is configured to communicatively couple the host to the peripheral device using a switch that implements a peripheral component interconnect express (PCIe) standard.

3. The controller as recited in claim 2, wherein enumeration and configuration of the topology associated with the communicative coupling between the host and the peripheral device comprises enumeration and configuration of a PCIe discovery tree.

4. The controller as recited in claim 1, wherein the host is communicatively coupled to the peripheral device using at least one of a serial attached small computer system interface (SAS) protocol, a serial advanced technology attachment (SATA) protocol, a redundant array of independent disks (RAID) standard, or a fibre channel (FC) protocol.

5. The controller as recited in claim 1, wherein facilitating enumeration and configuration of the topology associated with the communicative coupling between the host and the peripheral device comprises creating a device identifier for the peripheral device.

6. The controller as recited in claim 1, wherein facilitating enumeration and configuration of the topology associated with the communicative coupling between the host and the peripheral device comprises reporting a topology associated with a plurality of ports of the computer expansion bus.

7. The controller as recited in claim 1, wherein facilitating enumeration and configuration of the topology associated with the communicative coupling between the host and the peripheral device comprises receiving a configuration read passthrough message, and facilitating exploration of a domain associated with the computer expansion bus.

8. The controller as recited in claim 7, wherein the exploration of the domain associated with the computer expansion bus comprises a depth first search.

9. A non-transitory computer-readable storage medium having computer executable instructions configured to facilitate enumeration and configuration by a host of a peripheral device, the computer executable instructions comprising:
   causing a processor included in a controller communicatively coupling a host to a computer expansion bus configured to perform peripheral device enumeration and configuration to respond to a query received from the host regarding whether the controller supports host based enumeration and configuration of a peripheral device communicatively coupled to the host via the computer expansion bus;
   causing the processor to create a device identifier for the peripheral device; and
   causing the processor to report a topology associated with a plurality of ports of the computer expansion bus.

10. The non-transitory computer-readable storage medium as recited in claim 9, wherein causing the processor to report a topology associated with a plurality of ports of the computer expansion bus comprises a host based enumeration port event.

11. The non-transitory computer-readable storage medium as recited in claim 9, wherein the computer executable instructions further comprise causing the processor to initiate a host based enumeration action reply in response to a host based enumeration action request.

12. The non-transitory computer-readable storage medium as recited in claim 9, wherein the computer executable instructions further comprise receiving a configuration read passthrough message, and facilitating exploration of a domain associated with the computer expansion bus.

13. A controller comprising:
   a communications interface configured to communicatively couple a host to a computer expansion bus, the computer expansion bus configured to communicatively couple the host to a peripheral device using a switch that implements a peripheral component interconnect express (PCIe) standard;
   a processor configured to facilitate enumeration and configuration by the host of the peripheral device; and
   a memory having computer executable instructions stored thereon, the computer executable instructions configured for execution by the processor to facilitate enumeration and configuration of a PCIe discovery tree associated with the communicative coupling between the host and the peripheral device, wherein the PCIe discovery tree is enumerated and configured by the host,
   wherein facilitating enumeration and configuration of the PCIe discovery tree associated with the communicative coupling between the host and the peripheral device comprises responding to a query received from the host regarding whether the controller supports host based enumeration and configuration of the peripheral device.

14. The controller as recited in claim 13, wherein the host is communicatively coupled to the peripheral device using at least one of a serial attached small computer system interface (SAS) protocol, a serial advanced technology attachment (SATA) protocol, a redundant array of independent disks (RAID) standard, or a fibre channel (FC) protocol.

15. The controller as recited in claim 13, wherein facilitating enumeration and configuration of the PCIe discovery tree associated with the communicative coupling between the host and the peripheral device comprises creating a device identifier for the peripheral device.

16. The controller as recited in claim 13, wherein facilitating enumeration and configuration of the PCIe discovery tree associated with the communicative coupling between the host and the peripheral device comprises reporting a topology associated with a plurality of ports of the computer expansion bus.

17. The controller as recited in claim 13, wherein facilitating enumeration and configuration of the PCIe discovery tree associated with the communicative coupling between the host and the peripheral device comprises receiving a configuration read passthrough message, and facilitating exploration of a domain associated with the computer expansion bus.

18. The controller as recited in claim 17, wherein the exploration of the domain associated with the computer expansion bus comprises a depth first search.

\* \* \* \* \*